US008078829B2

(12) United States Patent
McCabe (10) Patent No.: US 8,078,829 B2
(45) Date of Patent: Dec. 13, 2011

(54) SCALEABLE ARRAY OF MICRO-ENGINES FOR WAVEFORM PROCESSING

(75) Inventor: Patrick Arthur McCabe, Crystal Beach, FL (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 1034 days.

(21) Appl. No.: 11/954,859

(22) Filed: Dec. 12, 2007

(65) Prior Publication Data

US 2009/0158007 A1 Jun. 18, 2009

(51) Int. Cl.
*G06F 15/00* (2006.01)

(52) U.S. Cl. .......................................... 712/10

(58) Field of Classification Search ............ 712/10, 712/14, 17, 25
See application file for complete search history.

(56) References Cited

U.S. PATENT DOCUMENTS

| | | | | |
|---|---|---|---|---|
| 4,720,780 A * | 1/1988 | Dolecek | | 712/18 |
| 5,410,723 A * | 4/1995 | Schmidt et al. | | 712/18 |
| 5,544,311 A | 8/1996 | Harenberg et al. | | |
| 5,815,723 A | 9/1998 | Wilkinson et al. | | |
| 5,966,528 A | 10/1999 | Wilkinson et al. | | |
| 6,728,862 B1 | 4/2004 | Wilson | | |
| 7,193,435 B2 | 3/2007 | Grabill et al. | | |
| 7,827,386 B2 * | 11/2010 | Lippincott et al. | | 712/25 |
| 2001/0039633 A1 * | 11/2001 | Swoboda et al. | | 714/28 |
| 2002/0133794 A1 * | 9/2002 | Kanapathippillai et al. | | 716/4 |
| 2006/0053343 A1 * | 3/2006 | Hayem | | 714/39 |
| 2006/0176077 A1 * | 8/2006 | Grabill et al. | | 326/39 |
| 2006/0294424 A1 | 12/2006 | Boyce | | |
| 2007/0195951 A1 * | 8/2007 | Leung | | 380/37 |
| 2008/0122483 A1 * | 5/2008 | Shiao et al. | | 326/38 |

OTHER PUBLICATIONS

Baas, B. et al. "ASAP: A Fine-Grained Many-Core Platform for DSP Application", IEEE Micro, IEEE Service Center, Los Alamitos, CA US LNKD-DOI:10.1109/MM.2007.29, vol. 27, No. 2, Jul. 2, 2007, pp. 0272-1732.
Schmidt U et al.: Datawave: A Single-Chip Multiprocessor for Video Application, IEEE Micro, IEEE Service Center , Los Alamitos, CA US LNKD-DOI:10.1109/40.87567, vol. 11, No. 3, Jun. 1, 1991, pp. 22-25, 88.

* cited by examiner

*Primary Examiner* — Jeffrey Pwu
*Assistant Examiner* — Scott M Sciacca
(74) *Attorney, Agent, or Firm* — RatnerPrestia (57) ABSTRACT

A system for implementing waveform processing in a software defined radio (SDR) includes a scaleable array processor having a plurality of micro-engines (MEs) interconnected by a two dimensional topology. Each micro-engine includes multiple FIFOs for interconnecting to each other in the two dimensional topology. One micro-engine communicates with another adjacent micro-engine by way of the respective FIFOs. The micro-engines are dedicated to predetermined algorithms. The two dimensional topology includes an array of N×M micro-engines interconnected by the multiple FIFOs. The N×M are integer numbers of rows and columns, respectively, in the array of micro-engines. The micro-engines are dedicated to baseband processing of data for RF transmission or RF reception.

10 Claims, 11 Drawing Sheets

SCALEABLE ARRAY OF MICRO-ENGINES FOR WAVEFORM PROCESSING

FIELD OF THE INVENTION

This invention relates, generally, to waveform processing. More specifically, this invention relates to performing waveform processing using a scaleable array processor.

BACKGROUND OF THE INVENTION

Communication devices such as cellular telephone handsets, cordless telephones, wireless local area network (WLAN) client stations, and other wired and wireless radio communication devices, require signal processing according to one of a variety of open or proprietary communication standards or protocols. Due to the numerous communication protocols being developed, efforts have been made to develop what is referred to as a software defined radio (SDR) device.

The concept behind the SDR device is the ability to reprogram and reconfigure a device with new capabilities, such as a new or modified communication protocol, while in an operational environment. These capabilities are also referred to as waveform processing and include digital signal processing functions, networking protocols, and other algorithms required for communication in accordance with a defined standard.

The modem processing portion of a modern radio device typically includes either one or more field programmable gate array (FPGA(s)) or one or more ASIC device(s) to host the digital signal processing (DSP) functions for the communication standard(s) supported by the device. These DSP functions tend to be very processing intensive and/or have time-critical execution constraints.

FPGA devices are generally used in SDR designs where waveform reprogrammability and reconfigurability, and waveform "download" objectives are important. In this case, when an operator selects a given waveform as a communications medium, the radio system loads the FPGA with the necessary DSP algorithms to operate the selected waveform. Likewise, when the operator selects another waveform as the communications medium (i.e., reprograms and re-configures the radio channel), the radio system reloads the FPGA with a different set of DSP algorithms required to operate the newly-selected waveform. The reprogrammability aspects of the FPGA also supports waveform "downloads", which involve incorporating changes to existing waveforms and adding new waveforms as they become available.

ASIC devices are generally used in radio applications where reprogrammability is not required. In this case, ASIC devices are generally built for one specific waveform, or for hosting well-defined DSP algorithms that may not be practical to implement in an FPGA.

One example of a waveform processor is disclosed by Grabill in U.S. Pat. No. 7,193,435, issued on Mar. 20, 2007, which is incorporated herein by reference in its entirety. As disclosed therein, a programmable ASIC includes several fixed hardware functions and reprogrammable hardware functions which are linked to one another by a programmable switch. These functions are linked together in a specific sequence to perform a desired operation.

Figure 1:
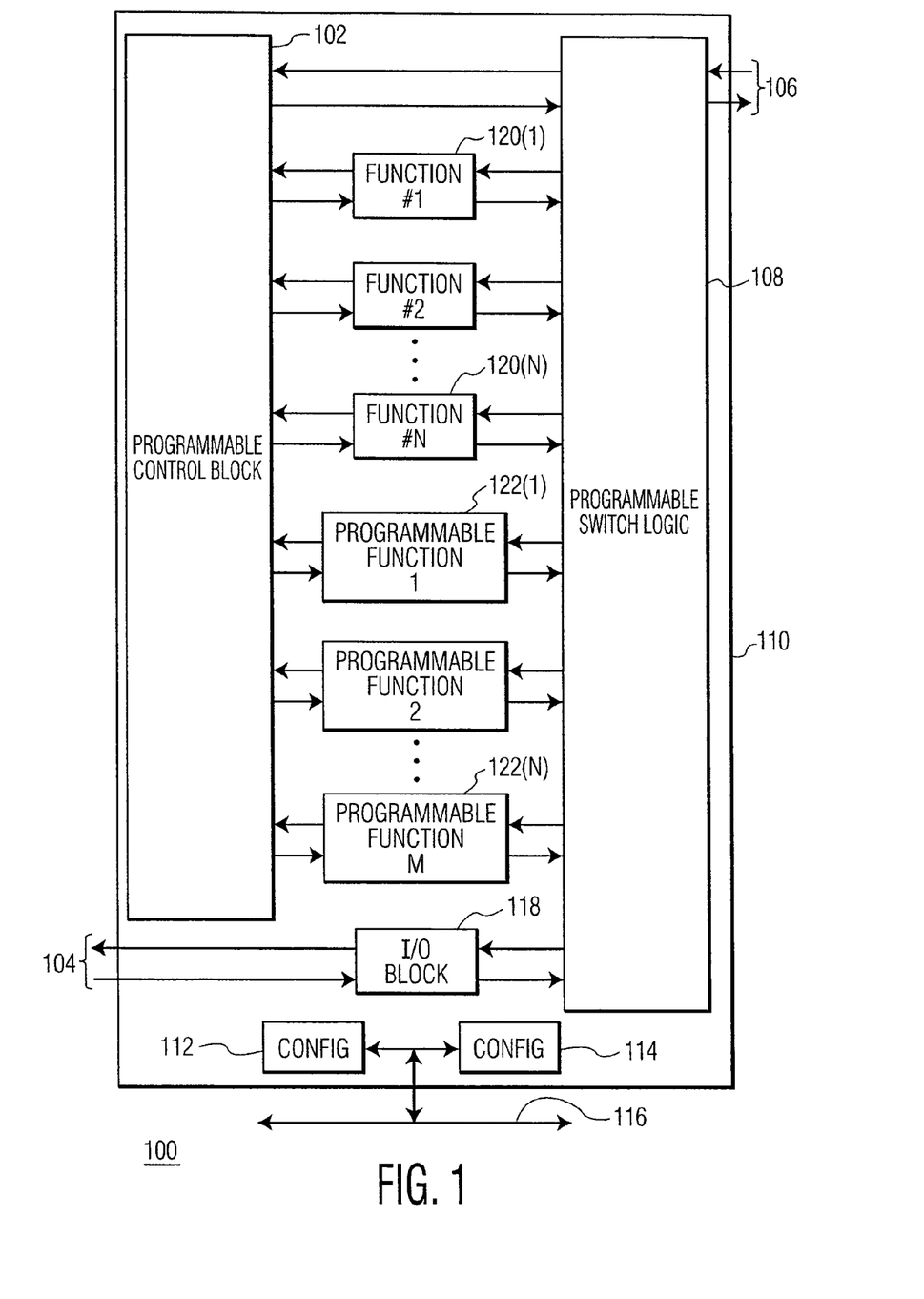
FIG. 1 is a functional block diagram of an ASIC providing fixed hardware functions and programmable hardware functions, which interface through a multi-layered, switch matrix.

Referring to FIG. 1, as disclosed by Grabill, there is shown a functional block diagram for a programmable ASIC, generally designated as 110. The programmable ASIC 110 includes multiple fixed hardware function blocks 120(1) to 120(N), multiple programmable hardware function blocks 122(1) to 122(N) and programmable switch logic 108. In addition, programmable control block 102, input/output (I/O) block 118, configuration blocks 112 and 114, and data buses 106, 116 and 104 provide programming control of the various hardware function blocks.

Each of the fixed hardware function blocks 120(1) to 120(N) and programmable hardware function blocks 122(1) to 122(N) connects bi-directionally to programmable switch logic 108 and programmable control block 102. In addition, programmable control block 102 connects bi-directionally to programmable switch logic 108.

The fixed functions blocks 120(1) to 120(N) include a set of common signal processing functions that are parameterized and implemented as fixed digital logic gates programmable ASIC 110. Each of the fixed function blocks 120(1) to 120(N) is parameterized such that its operational characteristics may be programmed using different operating parameters. This is convenient because many signal processing functions are common across a variety of applications (such as a variety of communication protocols or waveforms), whereas certain operating parameters (characteristics) of those function may be different depending on the application. By parameterizing the functions, the operational characteristics of any given function may be programmed for a specific application (e.g., communication standard or waveform).

Examples of fixed functions (applicable to a communication application) that may be parameterized include: finite input response (FIR), filter bank frequency excision, fast Fourier transform/inverse fast Fourier transform (FFT/IFFT), convolutional encoding/decoding, Walsh encoding/decoding, interleaving/de-interleaving, digital matched filters, digital quad mixer, automatic gain control, RAKE receiver, transmission security (TRANSEC) generation and phase locked loop clock generation.

In addition, each parameterized fixed function 120(1) to 120(N) provides a common interface in which data may pass from one function to another, via the programmable switch logic. As a result, the programmable switch logic connects the fixed function blocks in any order.

The programmable functions 122(1) to 122(N) provide signal processing functions that are not "hard" functions. The programmable functions 122(1) to 122(N) may be implemented using one or more FPGA cores within an ASIC, for example. This provides the ability to add new or modified signal processing functions if needed, after ASIC development and product fielding.

The programmable switch logic 108 links together in any combination required, one or more of the fixed functions 120(1) to 120(N) and programmable hardware functions 122(1) to 122(N). Since signal processing interfaces are typically identical, the programmable switch logic may connect together one or more of the functions in any order. The programmable switch logic 108 includes multiplexer logic that may be implemented in fixed digital logic gates or in an FPGA that may be controlled to select a desired path through the various functions.

The present invention, as will be described, provides an improved waveform processor, characterized by software reprogrammable functions. Specifically, the present invention includes a scaleable array processor for waveform processing which allows scaling, reconfiguration and reprogramming, and does not require a cumbersome switching matrix.

SUMMARY OF THE INVENTION

To meet this and other needs, and in view of its purposes, the present invention provides a system for implementing waveform processing in a software defined radio (SDR) including a scaleable array processor having a plurality of micro-engines interconnected by a two dimensional topology. Each micro-engine includes multiple FIFOs for interconnecting to each other in the two dimensional topology. One micro-engine communicates with another adjacent micro-engine by way of the respective FIFOs. The micro-engines are respectively dedicated to predetermined algorithms. The two dimensional topology includes an array of N×M micro-engines interconnected by the multiple FIFOs. N×M are integer numbers of rows and columns, respectively, in the array of micro-engines.

Each micro-engine is event driven, in that unless data is to be processed, the respective micro-engine is in a sleep mode. Unless data is present in an input FIFO of the respective micro-engine, the respective micro-engine is in the sleep mode.

Each micro-engine includes an independent local memory and an independent instruction memory, both coupled to an independent microprocessor. The independent microprocessor is configured to execute an independent algorithm on data present in a dedicated FIFO of the respective micro-engine. Each micro-engine includes an independent instruction memory coupled to an independent microprocessor and a respective FIFO for storing arriving data. A controller is configured to divide a stream of arriving data into at least two respective FIFOs of at least two respective micro-engines, and each of the two respective micro-engines is configured to execute an independent instruction on the divided stream of arriving data stored in the respective FIFOs.

Another embodiment of the present invention is an array processing system including a plurality of processing engines interconnected as an array processor, where each processing engine includes multiple FIFOs. At least one FIFO of the multiple FIFOs of each processing engine provides an interconnection to at least another FIFO of the multiple FIFOs of another processing engine. Each processing engine has an independent local memory. Each processing engine has an independent instruction memory coupled to an independent microprocessor for executing multiple independent instructions. The multiple FIFOs of each processing engine are configured to transmit parallel bits of data received from other processing engines to the respective independent microprocessor. The transmitted parallel bits of data are operated on by the respective independent microprocessor, executing an independent instruction arriving from the respective independent instruction memory. The plurality of processing engines are interconnected in an array matrix of N×M rows and columns, where N and M are integer numbers. Each processing engine includes north, south, east and west FIFOs, for communicating, respectively, with adjacent south, north, west and east FIFOs of other processing engines.

Each of the processing engines is event driven, in that unless data is to be processed, the respective processing engine is in a sleep mode. Unless data is present in an input FIFO of the respective processing engine, the respective processing engine is in the sleep mode.

Still another embodiment of the present invention is an array processing system including a plurality of processing engines interconnected as an array processor. Each processing engine includes multiple FIFOs. At least one FIFO of the multiple FIFOs of each processing engine provides an interconnection to at least another FIFO of the multiple FIFOs of another processing engine. Each processing engine has an independent local memory. Each processing engine has an independent instruction memory coupled to an independent microprocessor for executing multiple independent instructions. Each processing engine includes a plurality of registers for executing the multiple independent instructions. The plurality of registers from each processing engine is coupled to a multiplexer network, and a debug port is coupled between the multiplexer network and a host processor. The host processor is configured to query each of the plurality of registers and receive data stored in the queried register by way of the multiplexer network for debug examination. Each processing engine includes north, south, east and west FIFOs, for communicating, respectively, with adjacent south, north, west and east FIFOs of other processing engines. The plurality of processing engines are arranged in an array matrix, and each of the processing engines is event driven, in that unless data is to be processed, the respective processing engine is in a sleep mode.

Yet another embodiment of the present invention is an array processing system including a plurality of processing engines interconnected as an array processor. Each processing engine includes multiple FIFOs. At least one FIFO of the multiple FIFOs of each processing engine provides an interconnection to at least another FIFO of the multiple FIFOs of another processing engine. Each processing engine has an independent local memory. Each processing engine has an independent instruction memory coupled to an independent microprocessor for executing multiple independent instructions. The multiple FIFOs of each processing engine transmit parallel bits of data received from other processing engines to the respective independent microprocessor. The parallel bits of data are operated on by the respective independent microprocessor executing an independent instruction arriving from the respective independent instruction memory. Each processing engine includes an active mode and an inactive mode. A clock is configured to sequence each processing engine during execution of the multiple independent instructions. The active mode includes executing the multiple independent instructions and the inactive mode includes not executing the multiple independent instructions. Each processing engine is configured to monitor the respective multiple FIFOs for presence of the parallel bits of data. When the respective multiple FIFOs of a processing engine are empty, the clock is gated OFF to place the processing engine in the inactive mode. When the respective multiple FIFOs of the processing engine include data, the clock is gated ON to place the processing engine in the active mode.

It is understood that the foregoing general description and the following detailed description are exemplary, but are not restrictive, of the invention.

BRIEF DESCRIPTION OF THE FIGURES

The invention may be understood from the following detailed description when read in connection with the following figures.

DETAILED DESCRIPTION OF THE INVENTION

Figure 2:
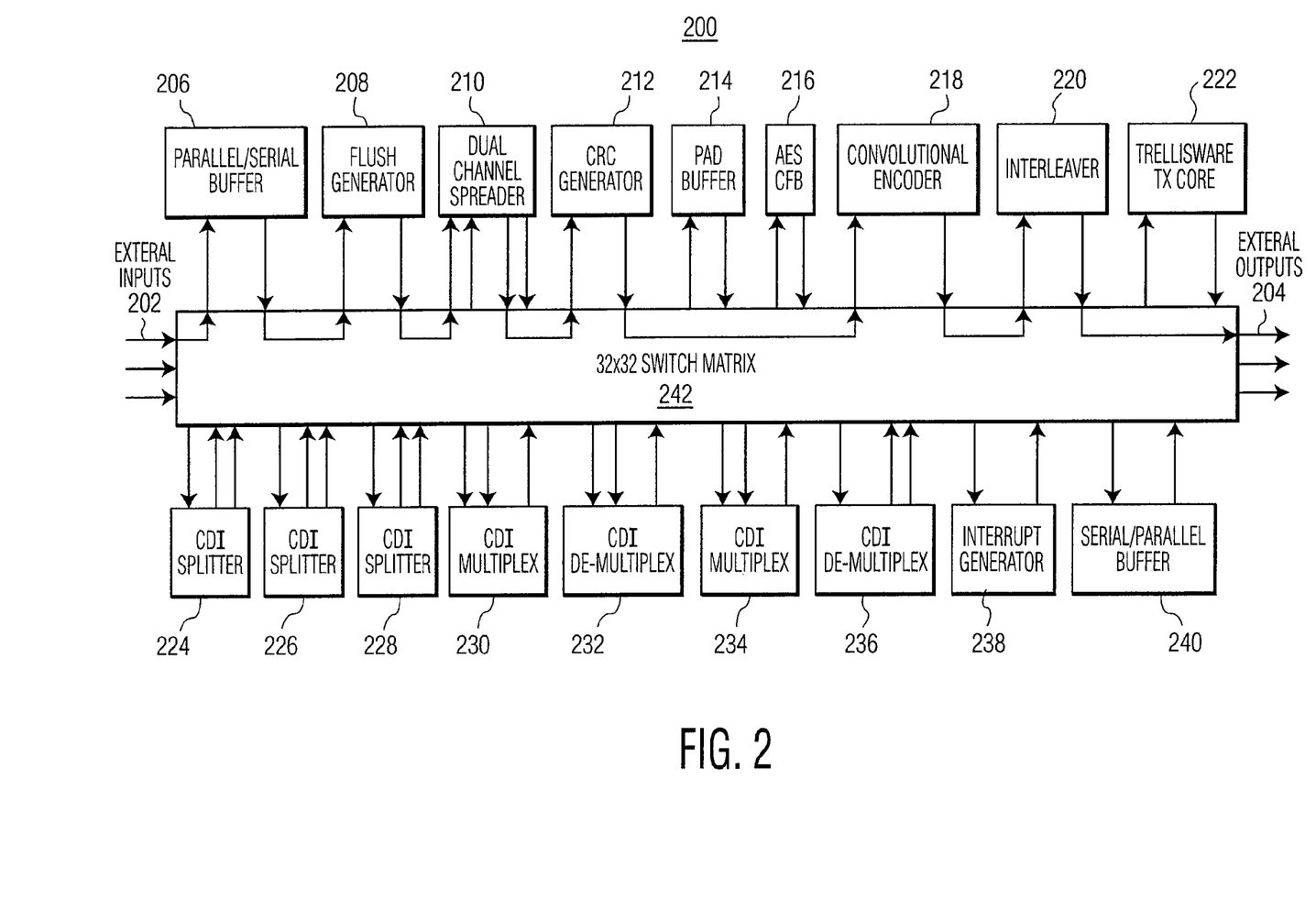
FIG. 2 is a functional block diagram of a switch matrix interfacing with exemplary waveform processing functions.

As described with respect to FIG. 1, each processing path for executing a sequence of waveform processing functions, in a specific order, is controlled by a switching matrix, shown as programmable switch logic 108. Referring to FIG. 2, there is shown, as an example, a 32×32 switching matrix, designated as 242. The switching matrix allows different paths to be routed to and from various processing functions that are included in a software defined radio system (SDR), designated as 200. As shown, input data is routed from bus 202 to parallel/serial buffer 206 by way of switch matrix 242. Once the data is converted into the proper format, for example, serial data streams, each having a predetermined bit structure, the formatted serial data is sent back to switch matrix 242 for further routing. The formatted serial data is then sent to a flush generator, designated as 208, then sent back to the switch matrix. The routing path continues, with the flushed data being sent from the switch matrix to a dual channel spreader, shown as block 210. This block multiplies up to two data streams with a pseudo-random (PN) sequence. Channel spreading converts the data stream from a narrow band signal into a wide band signal. The spread sequence is then sent to a cyclic redundancy check (CRC) generator 212, again through the switch matrix. The CRC generates code-words of a finite length that represent the data streams. These code-words are used to detect error patterns caused by channel noise. The data streams are then sent to convolutional encoder 218 which provides another error-detection coding technique. The encoded sequence is sent through switching matrix 242 and then forwarded to interleaver 220, which interleaves two or more sequences before being outputted through busses 204. In one example, external busses 204 may be connected to a radio frequency (RF) modulator for wireless transmission.

System 200 includes other communication functions that are interconnected by way of switching matrix 242. These functions, as shown, include splitters 224, 226, 228; multiplexers 230, 234; de-multiplexers 232, 236; interrupt generator 238; and serial to parallel buffer 240.

System 200 provides generic functions for communications, such as function A 216 and function B 222, thereby realizing a programmable system usable for a variety of operations. System 200, however, requires a large and complex switching matrix that has multiple layers. For every communication operation, one switch layer is required for providing a specific routing path among the processing functions. If system 200 is used for 10 different operations, for example, 10 switch layers are required. After fabrication of switch matrix 242, new communication operations cannot be added into system 200, without adding new switching layers, thereby requiring a new switch matrix.

Figure 3:
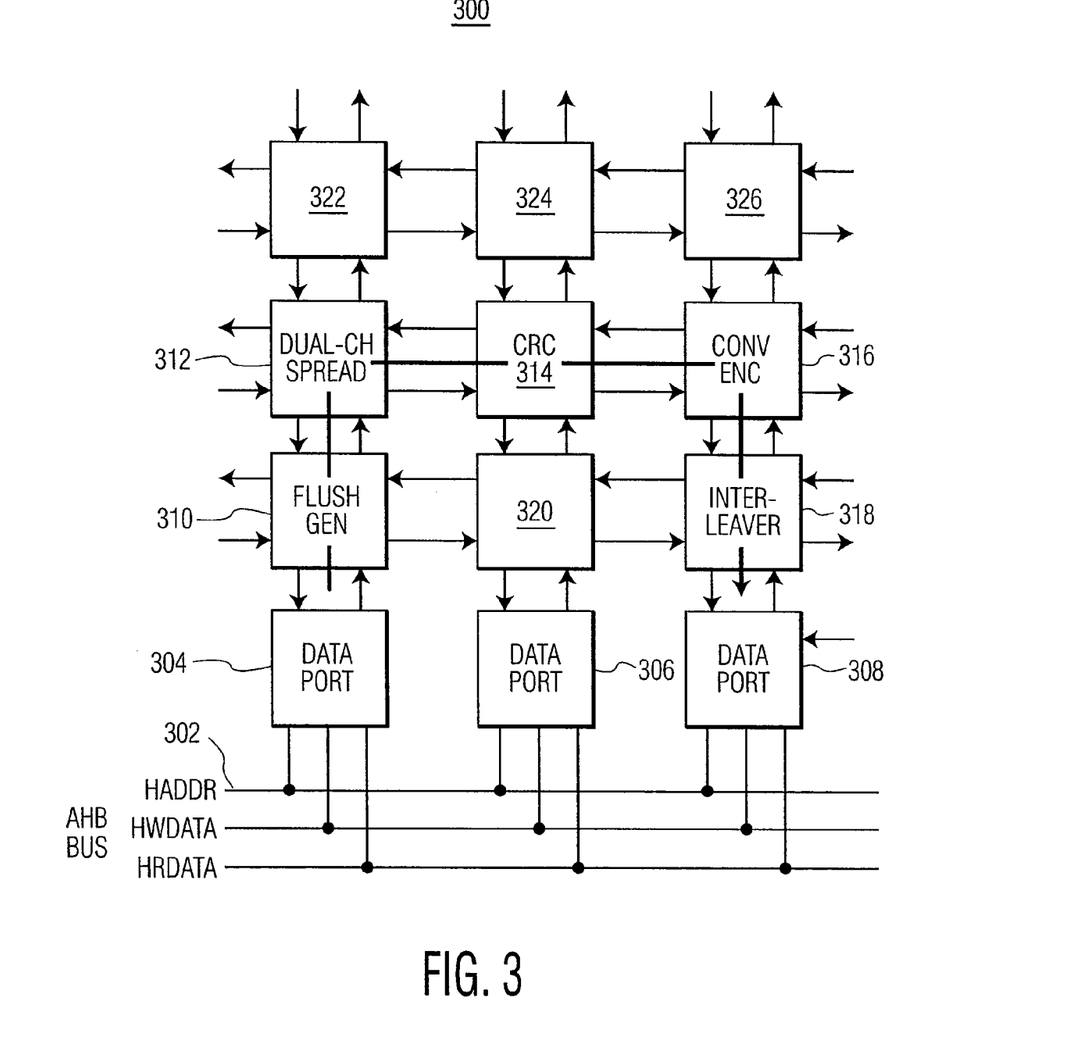
FIG. 3 is a scaleable array processor for performing exemplary waveform processing functions, which is free-of any switch matrix, in accordance with an embodiment of the present invention.

The present invention, in one embodiment, has advantageously eliminated the switch matrix. As shown in FIG. 3, scaleable array processor 300 includes processing micro-engines (MEs) 310-326, data ports 304-308 and on-chip bus 302. Each of the MEs 310-326 is programmed to execute a specific waveform processing algorithm. Data ports 304-308 provide access by the MEs to on-chip bus 302. In the example of FIG. 3, data streams are inputted to data port 304 by way of on-chip bus 302. The data ports have separate address busses and separate data busses for reading and writing. The data is routed through a sequence of MEs each executing a predetermined waveform processing algorithm. No switching matrix is necessary.

The predetermined processing algorithm is similar to the waveform processing algorithms shown in FIG. 2. As such, a data stream is first inputted from data port 304 to flush generator 310. After flush generator 310 packs additional bits into the data stream, the data stream is directly passed to dual channel spreader 312 without need for a switching matrix. After the dual channel spreader completes exclusive OR-ing of the data stream with a PN code, the data stream passes sequentially to CRC 314, convolutional encoder 316 and interleaver 318. After waveform processing is completed, the encoded data stream is passed to on-chip bus 302 via data port 308.

It is thus possible to configure any one of the MEs to perform any predetermined algorithm. It is also possible to implement any required path among the MEs without a cumbersome switching matrix. The path flows directly from one ME to an adjacent ME, as shown. If additional waveform processing functions are required, that function may be performed by another ME inserted in the path. In the example of FIG. 3, a specific waveform operation flows sequentially through five MEs. Scaleable array processor 300, thus, provides flexible waveform processing operations utilizing a matrix of MEs, each executing a reprogrammable algorithm.

Figure 4:
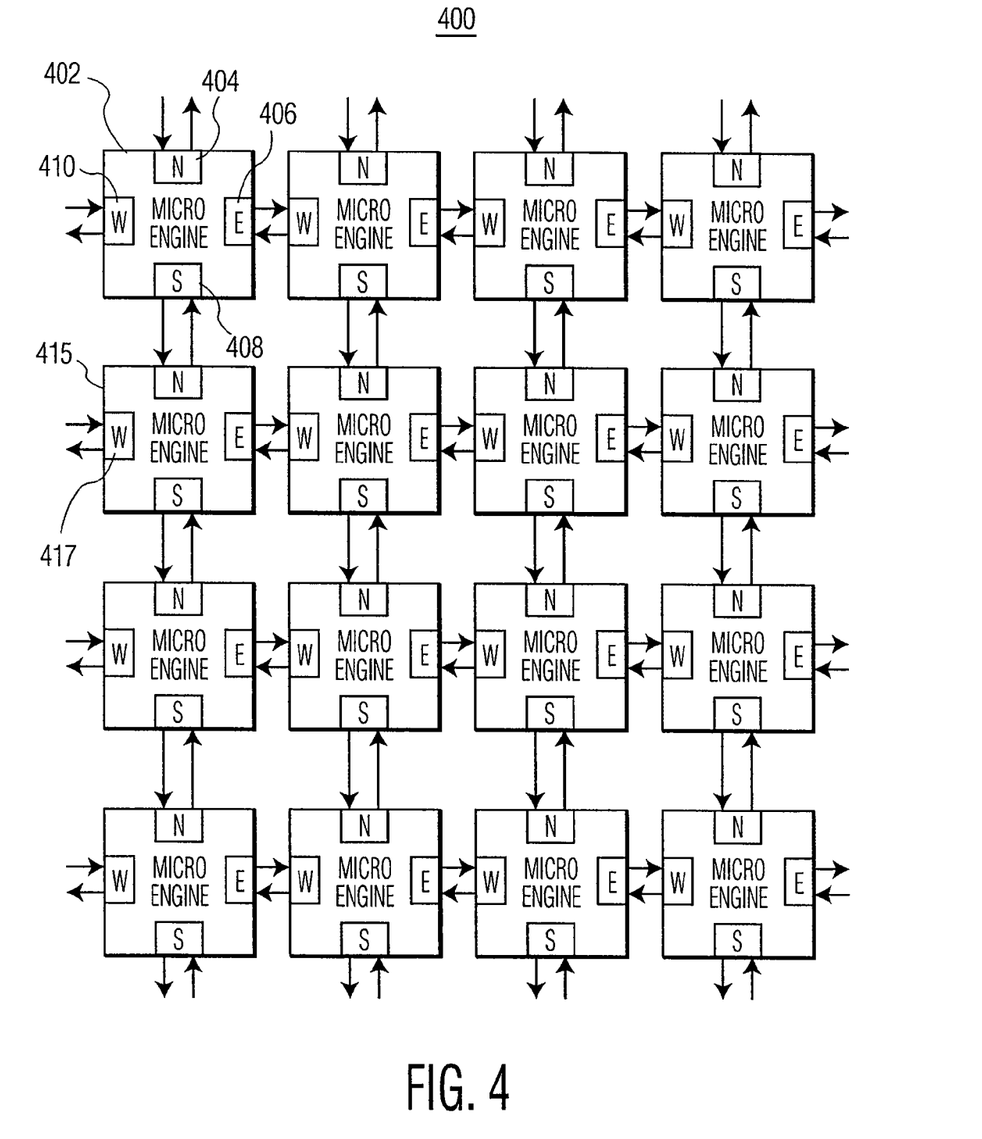
FIG. 4 is a functional block diagram of a scaleable array processor, showing multiple FIFOs residing in respective micro-engines (MEs) for communicating with other MEs in the scaleable array processor, in accordance with an embodiment of the present invention.

The scalability and path flexibility of array processor 300 is best shown by referring to FIGS. 4 and 5. FIG. 4 depicts a 4×4 array processor having four rows and four columns of MEs, generally designated as 400. Each ME 402 communicates directly with a neighboring ME in the processing path via first-in-first-out (FIFO) buffers. For example, ME 402 may communicate with its north, south, east and west neighbors, respectively, via north FIFO 404, south FIFO 408, east FIFO 406 and west FIFO 410. The ME may pass data to one or all four of its neighbors by using these FIFO buffers.

In one example, a 2-D scaleable array architecture, such as system 400, may be implemented as a multiple instruction multiple data (MIMD) system, which allows an ME to perform independent operations on independently received data. For example, ME 402 may receive data by way of FIFO 410, while ME 415 receives data by way of FIFO 417.

As another example, the data may arrive as one stream by way of on-chip bus 302 (FIG. 3) where a portion of the data stream is received by FIFO 410 in ME 402 and another portion of the data stream is received by FIFO 417 in ME 415. The data received by ME 402 is operated on by an algorithm executed in ME 402, while the data received by ME 415 is independently operated on by an algorithm executed in ME 415. The two separately processed portions of data may be reformatted and put together as one data stream by way of another ME in the matrix.

Figure 5A:
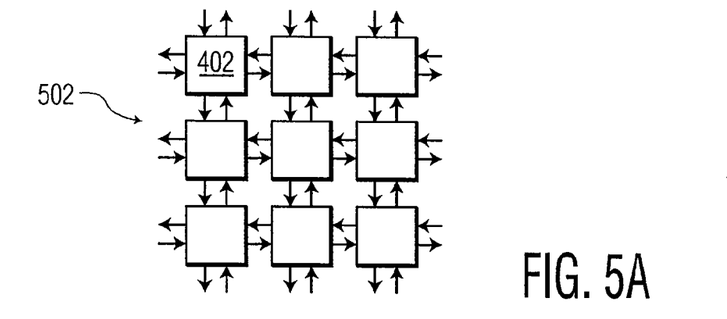
FIGS. 5*a*, 5*b* and 5*c* are block diagrams of exemplary sized matrices of a scaleable array processor.
Figure 5B:
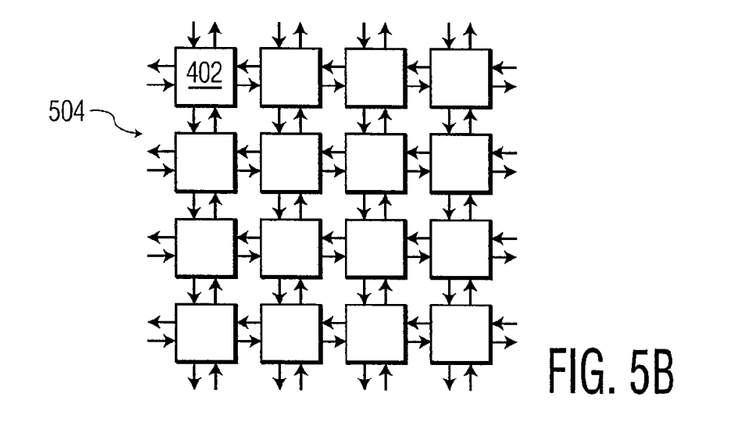
Figure 5C:
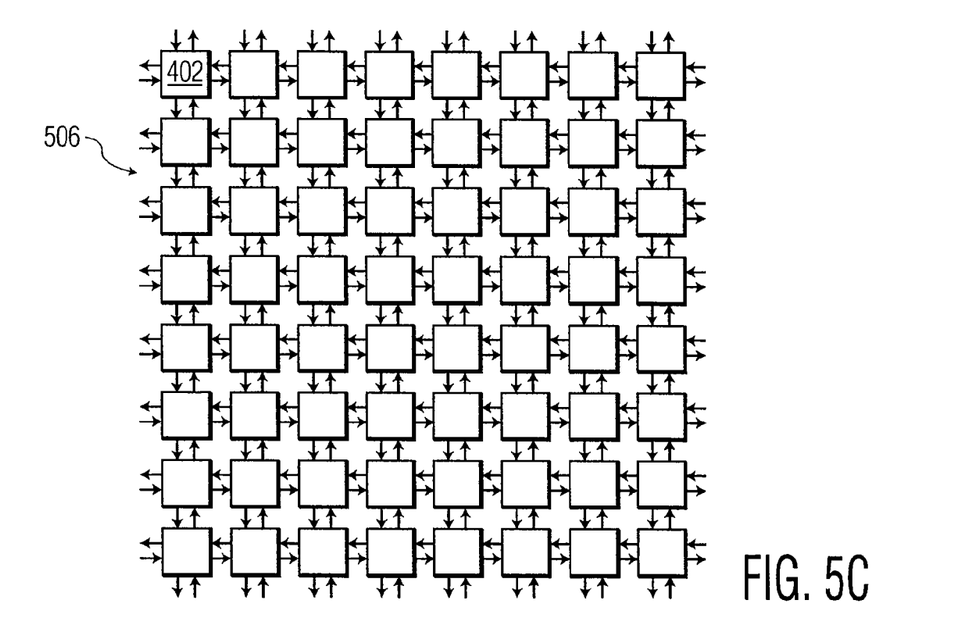

Scalability is possible utilizing an array architecture. FIG. 5 shows three examples of different array sizes. Array 502 in FIG. 5*a* is a 3×3 matrix including 9 MEs, array 50 in FIG. 5*b* is a 4×4 matrix including 16 MEs and array 506 in FIG. 5*c* is an 8×8 matrix including 64 MEs.

Figure 6:
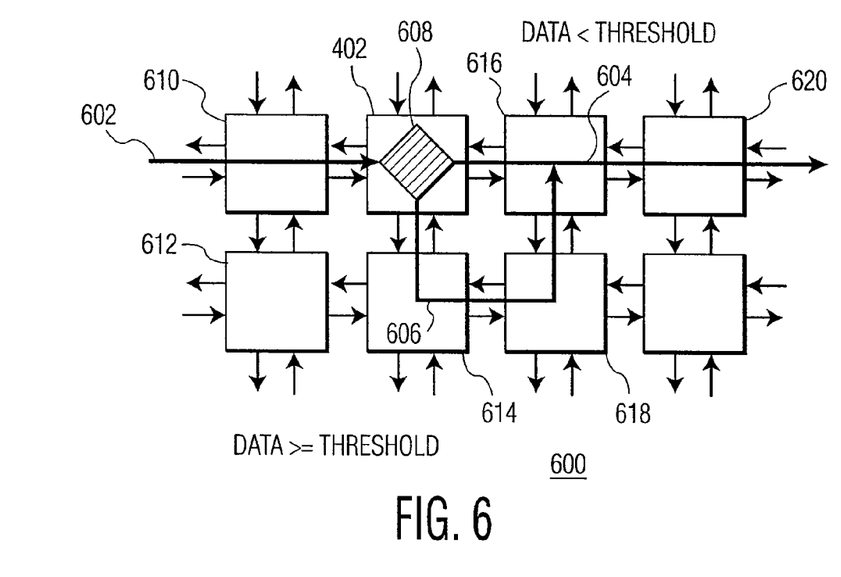
FIG. 6 is a functional block diagram showing a data-dependent flow path, for executing different waveform processing functions, in accordance with an embodiment of the present invention.

Data flow through a scaleable array processor is programmable and may be configured in various ways. For example, data flow may be dependent on the incoming data, and may be single-threaded or multi-threaded. Thus, FIG. 6 shows scaleable array processor 600 having a flow path dependent on data. Specifically, data flows from ME 610 by way of path 602 into ME 402 which includes decision box 608. Decision box 608 determines whether the received data is smaller than or larger than a predetermined threshold. If the data is smaller than the threshold, then the data is branched through MEs 616 and 620 by way of flow path 604. If the data, however, is larger than or equal to the threshold, as determined by decision box 608, the data flows through MEs 614, 618 and 616 by way of flow path 606. Furthermore, data flow may also be programmed using multiple threads which results in multiple independent data paths.

Figure 7:
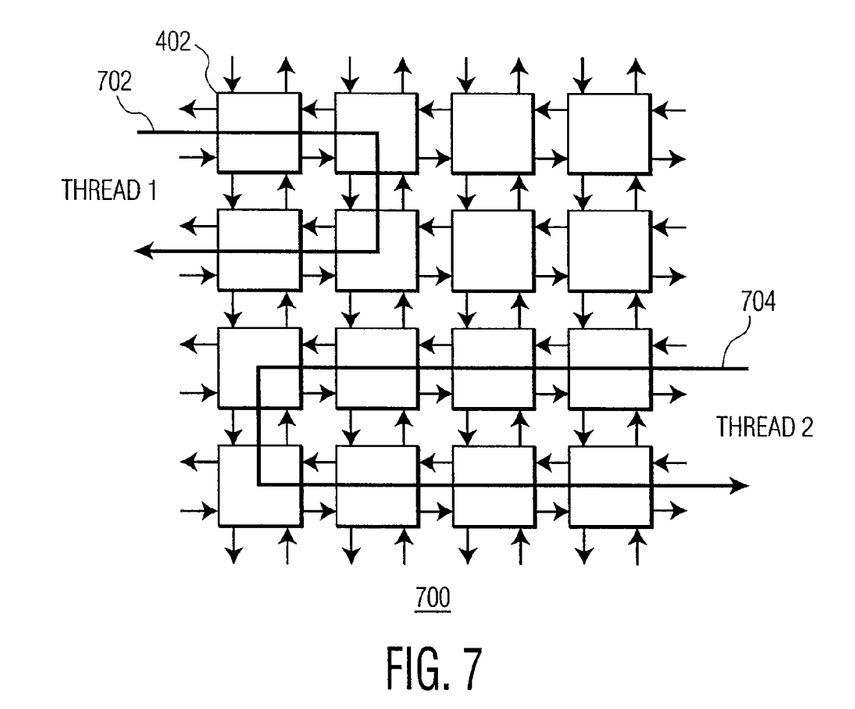
FIG. 7 is a functional block diagram showing a multi-threaded data flow paths, for executing different waveform processing functions, in accordance with an embodiment of the present invention.

Multiple threaded data flow may be needed in order to decrease processing time of the received data. For example, FIG. 7 shows scaleable array processor 700 having two data flows. Specifically, threaded path 702 and threaded path 704 are two independent paths sequencing through different MEs executing independent algorithms. Threaded path 1 is routed through four MEs, whereas threaded path 2 is routed through eight MEs. In one example, threaded path 1 may implement an algorithm including functions similar to the waveform processing functions shown in FIG. 3, whereas threaded path 2 may implement a different algorithm requiring more processing functions and, hence, requiring sequencing through more MEs. If necessary, the separately outputted data from threaded paths 702 and 704 may be formatted together as a single data stream for further processing, if necessary, or for external transmission by using additional MEs (not shown).

Figure 8:
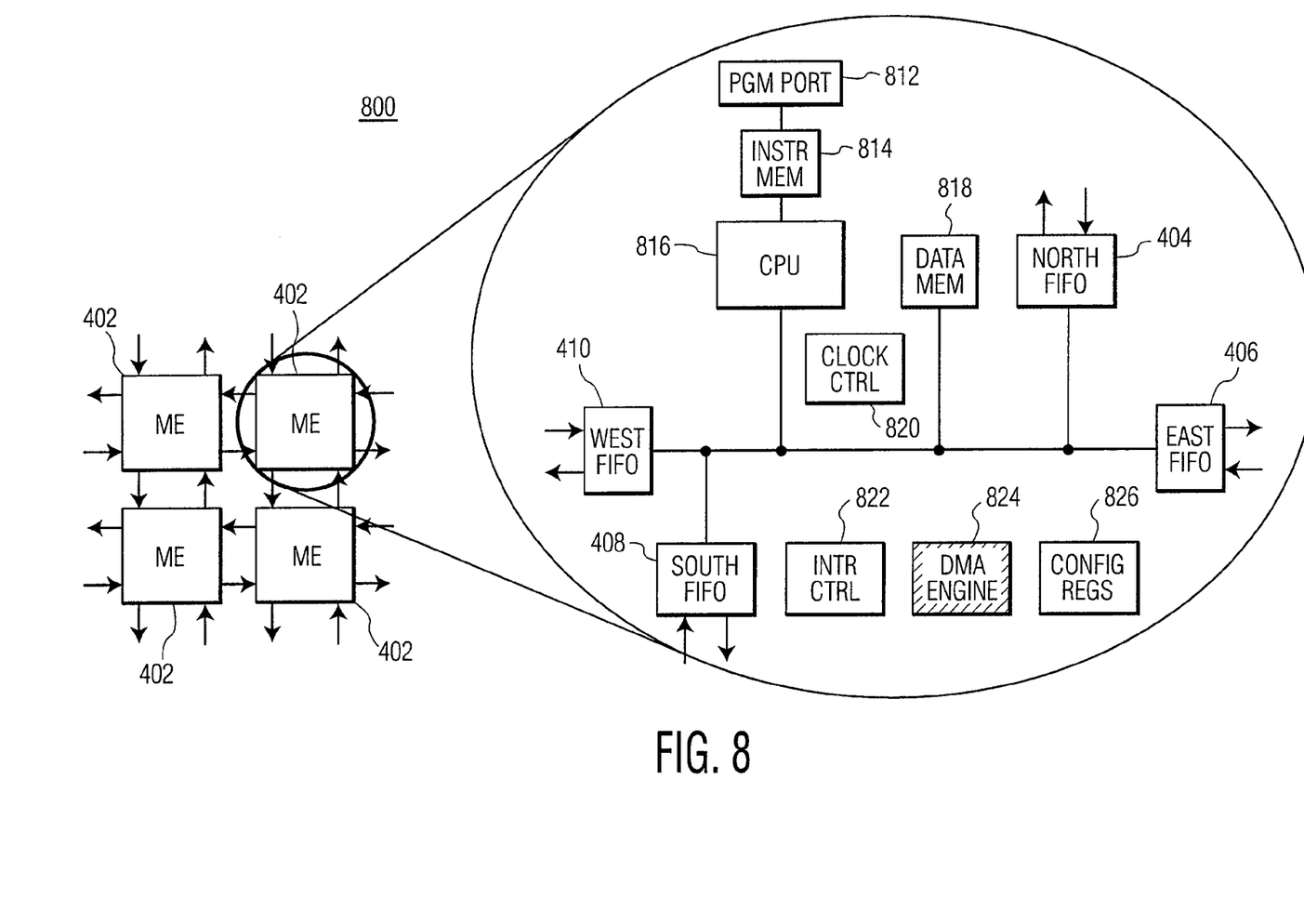
FIG. 8 is a functional block diagram of exemplary components in a single micro-engine (ME) of the scaleable array processor, in accordance with an embodiment of the present invention.

As contemplated by the present invention, each ME of a scaleable array processor, designated as 800, includes the components shown in FIG. 8. As shown, each ME 402 includes north FIFO 404, south FIFO 408, east FIFO 406 and west FIFO 410 for communicating with neighboring MEs. Each ME 402 also includes central processing unit (CPU) 816 for processing data received through the FIFOs. Instruction memory 814 stores the processing steps performed by CPU 816 on the received data. As shown, the present invention also includes a dedicated programming port, designated as 812, for loading the algorithm stored in instruction memory 814. Also included is an independent memory 818, which is dedicated to ME 402, for storing interim and final processed data. Completing the components in the figure, there is shown clock controller 820 (further described later), and interrupt 10 controller 822 for alerting CPU 816 for presence of received data in one of the four FIFOs used as an input FIFO. A DMA engine 824 may be included for routing data to other memory devices, and configuration registers 826 may be included for configuring ME 402 to a specific version or operating mode. Accordingly, every ME in the array processor of the present invention operates independently of other MEs in the matrix array.

Figure 9:
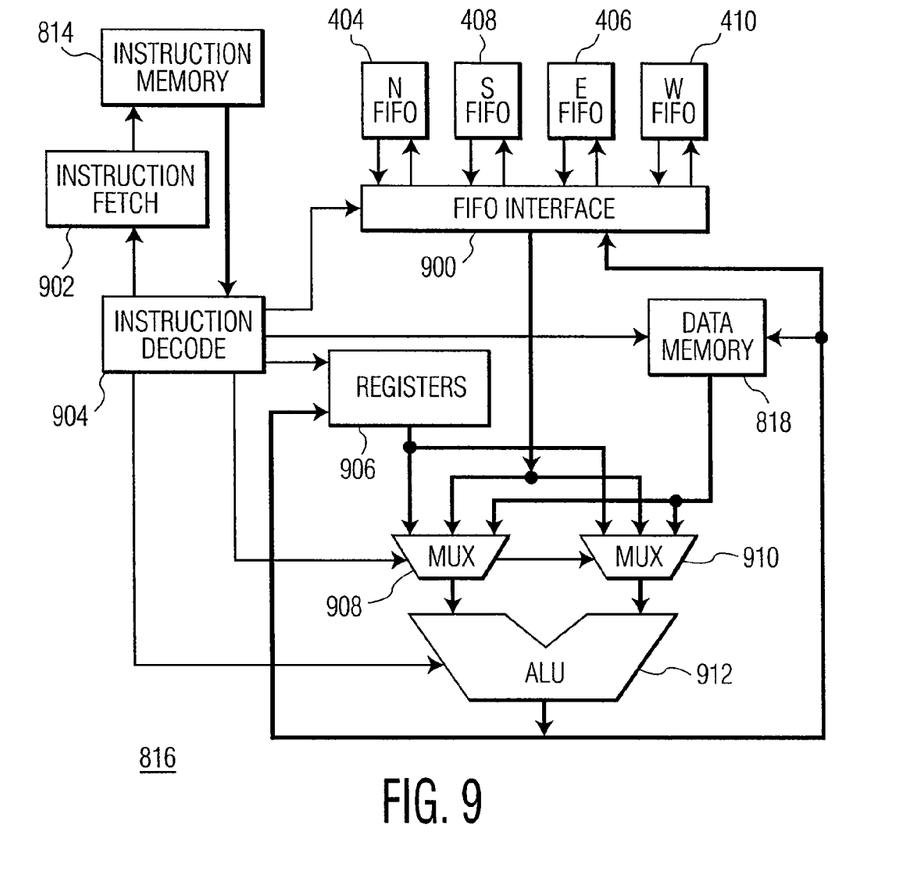
FIG. 9 is a functional block diagram depicting multiple FIFOs of a single ME providing multiple input data to an independent arithmetic logic unit (ALU) of a single ME of the scaleable array processor for implementing multiple instructions with multiple data (MIMD) architecture, in accordance with an embodiment of the present invention.

Referring next to FIG. 9, additional detail of an ME of the present invention is shown, in accordance with an embodiment designated as 816. As shown, the FIFOs 404-410 are connected to FIFO interface 900. In turn, FIFO interface 900, registers 906 and data memory 818 are connected to arithmetic logic unit (ALU) 912 through multiplexers 908 and 910. Furthermore, instruction memory 814 is connected to instruction fetch 902 and instruction decoder 904. Accordingly, instructions may be fetched from instruction memory 814 by instruction fetch 902 and decoded by instruction decoder 904 to control FIFO interface 900, data memory 818, registers 906, multiplexers 908-910 and ALU 912. In this manner, ME 816 may be implemented as an MIMD architecture. Up to four separate sets of input data may be brought together and operated on by ALU 912 upon multiplexing a portion of the input data through multiplexer 908 and another portion through multiplexer 912. The ALU may also operate on data provided from data memory 818 which may store interim processed data. By utilizing the architecture of ME 816, it is possible to independently manage instructions and data. In addition, the data does not need to be of the same type or the same size. Furthermore, the data and instruction requests do not have to be interleaved on the same processing path. The processed output data may be placed in the same north, south, east and/or west FIFOs for transmission to the on-chip bus (FIG. 3) or other adjacent neighbor MEs.

Figure 10:
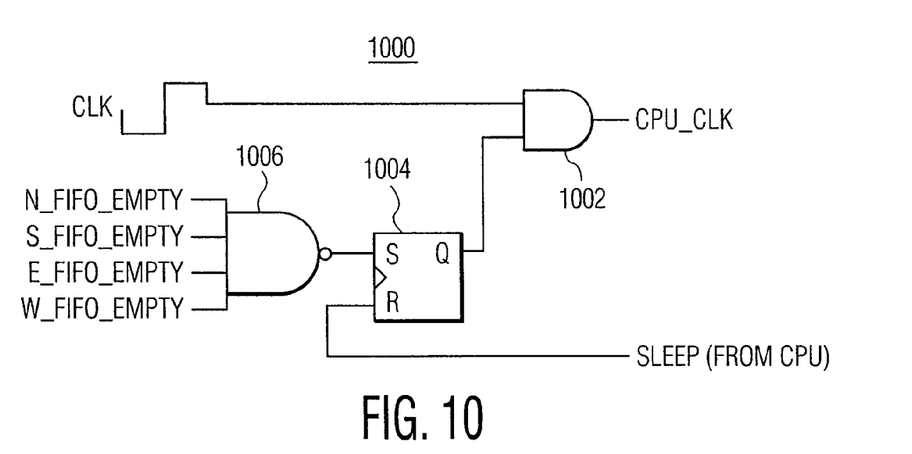
FIG. 10 is a block diagram of an exemplary SR flip-flop for disabling a CPU clock signal in order to place an ME in a sleep, low power mode, in accordance with an embodiment of the present invention.

The clock controller 820 shown in FIG. 8 will now be described in more detail. Referring to FIG. 10, there is shown an embodiment of a clock controller, generally designated as 1000. The clock controller is effective in reducing power consumption of each ME in the array matrix by placing the respective ME in a sleep mode. More specifically, each of the FIFOs of an ME is monitored by clock controller 1000 for gating the CPU clock on or off. Thus, if data is present in any of the FIFOs, the CPU clock is gated on. If data is not present in any of the FIFOs, however, the CPU clock is gated off. By gating off the CPU clock, the ME is able to advantageously operate in a low powered, sleep mode.

As one example, when data is present in any of the FIFOs, NAND gate 1006 produces a logic 1 which triggers flip-flop 1004 to produce a logic 1. The logic 1 output of flip-flop 1004 enables AND gate 1002 which, in turn, gates on the CPU clock signal. When the clock signal is gated on, the CPU is configured to operate on the data present in the FIFOs. When all the FIFOs are empty, however, NAND gate 1006 produces a logic 0, which disables flip-flop 1004 and AND gate 1002, thereby gating off the CPU clock signal. The CPU operation in each ME is thus event driven, the event being the presence of data in a FIFO. The event is effective in reducing power usage when there is no need for the CPU to be active.

Figure 11:
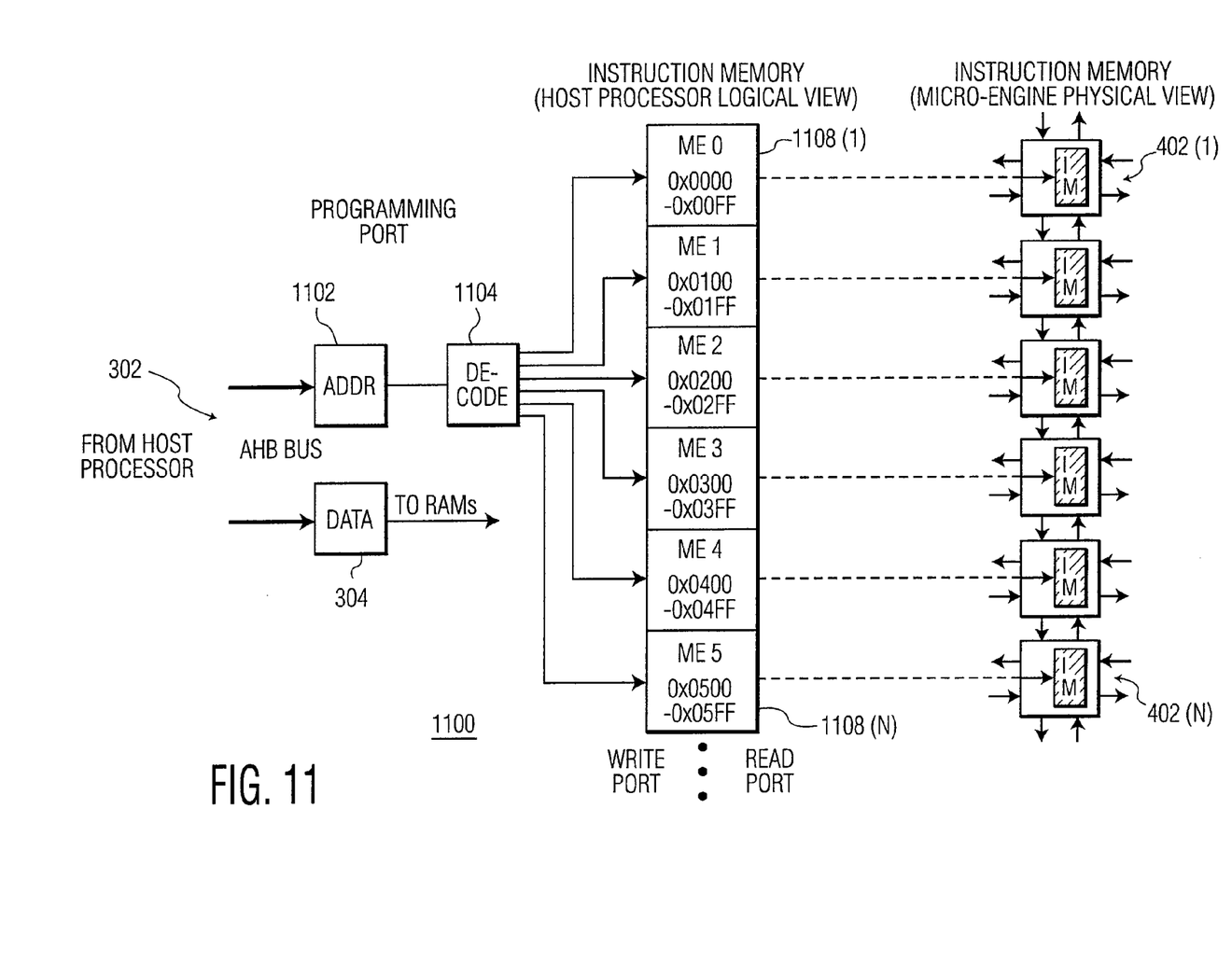
FIG. 11 is a functional block diagram showing a dedicated programming port for directly providing programming instructions into an independent memory (IM) of an ME, in accordance with an embodiment of the present invention.

As previously described, each ME has an independent instruction memory, which stores independent instructions for operating on the data in an ME. As shown in FIG. 11, a host processor (not shown) may be used to program each ME with its own instructions, by way of on-chip bus 302 which includes data bus 304 and address bus 1102. The host processor instructions may be logically mapped to consecutive physical registers of an instruction memory in the respective ME. For example, decoder 1104 may decode the address ranges provided by the host processor through address port 1102.

A logical view of the address ranges may include address ranges 1108(1)-1108(N). These address ranges may be mapped to physically separate instruction memories in MEs 402(1)-402(N). For example, instructions stored in hexadecimal address range 0x0000-0x00FF may be decoded and sent to ME 402(1), which corresponds to ME 0. In addition, the set of instructions stored in hexadecimal address range 0x0100-0x01FF may be stored in the instruction memory registers of ME1, etc. Therefore, the host processor may store instructions in a memory using logical addresses which may be mapped to physical registers in each ME of an array processor. The present invention, thus, allows an external processor to initialize and independently program the instruction memory of each respective ME of an array processor.

Figure 12:
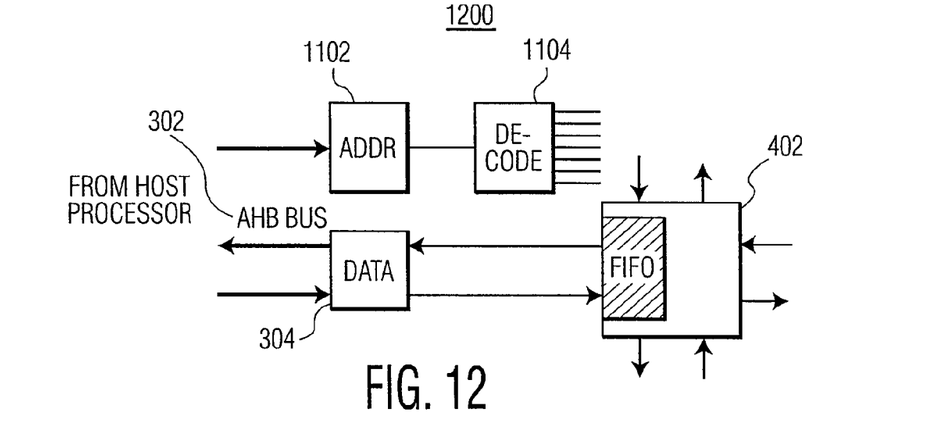
FIG. 12 is a functional block diagram showing an on-chip bus, as an example, for communicating with an ME of a scaleable array processor, in accordance with an embodiment of the present invention.

Furthermore, while decoder 1104 maps logical addresses into physical ME addresses, data port 304 provides the data. This data may include instruction data or signal data requiring waveform processing. Multiple data ports 304 are also shown in FIG. 3 as ports 304, 306, 308. One such port is shown in FIG. 12, where ME 402 of the scaleable array processor is connected to on-chip bus 302 by way of data port 304. Data port 304 couples the FIFOs of ME 402 to on-chip bus 302 and allows data to be written from the host processor to ME 402 and, conversely, allows data to be read from the ME by the host processor. The FIFOs may be one or more of the four FIFOs of each ME, namely, the north, south, east and west FIFOs. For example, in FIG. 3 data may pass from on-chip bus 302 to the south FIFO of flush generator 310 via data port 304. The output of interleaver 318 may be passed from its south FIFO to on-chip bus 302 via data port 308. Accordingly, data sent from a host processor over on-chip bus 302 may be sent to any number of MEs that are connected through a data port.

Figure 13:
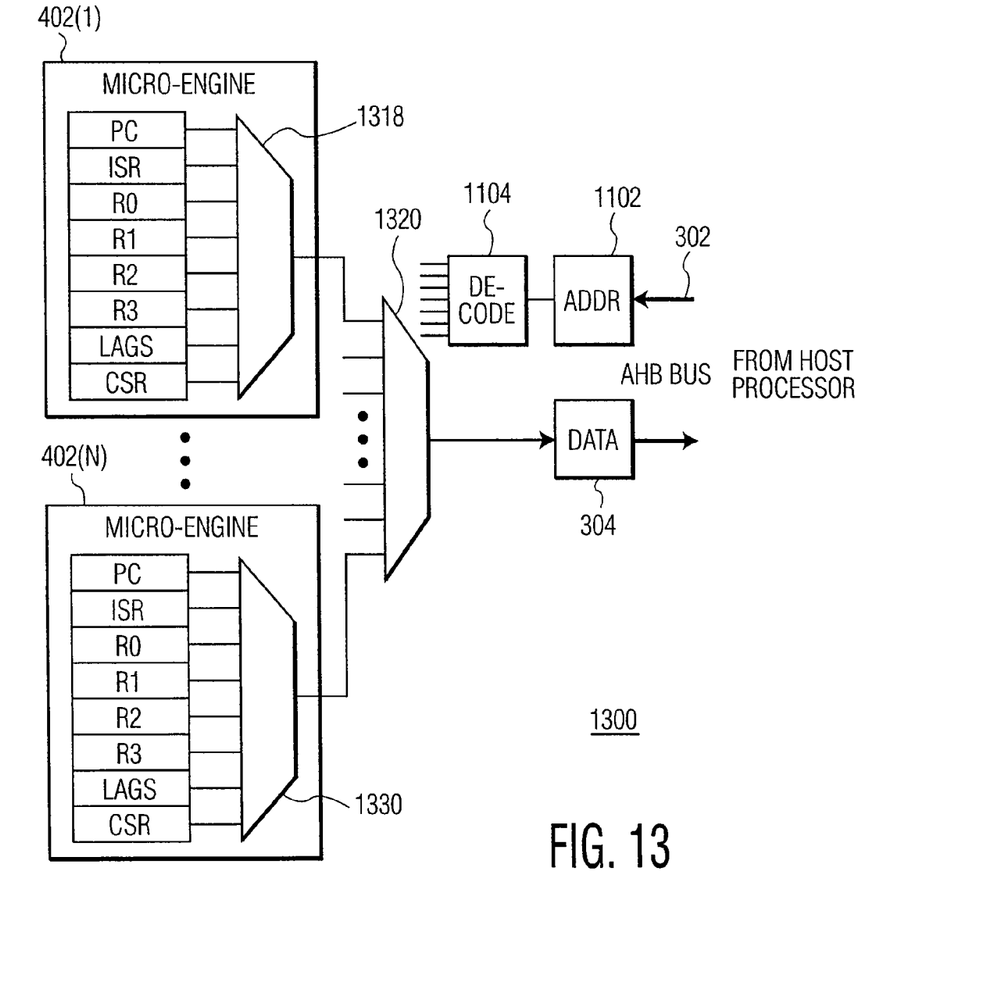
FIG. 13 is a block diagram showing a debug port for directly accessing, from a host processor, via a multiplexer network, the internal registers of respective MEs of a scaleable array processor, in accordance with an embodiment of the present invention.

The scaleable array processing system of the present invention provides an efficient manner for programming the instructions of every ME in the array. Similarly, the present invention provides an efficient manner for degugging every ME in the array by allowing direct examination of its registers through an independent debug port, as shown in FIG. 13. Accordingly, each ME in the processing path allows direct access to its local registers. This is accomplished by providing a multiplexer network for accessing each register of an ME. An exemplary debug system 1300 is shown in FIG. 13, generally designated as 1300.

The debug system 1300 includes a multiplexer dedicated to each ME. Only two such multiplexers are shown in FIG. 13, namely ME 402(1) includes dedicated multiplexer 1318 and ME 402 (N) includes dedicated multiplexer 1330. The registers of micro-engine 402(1) may be read through data port 304 by way of dedicated multiplexer 1318 and common multiplexer network 1320. Similarly, the registers of micro-engine 402(N) may be read through data port 304 by way of dedicated multiplexer 1330 and common multiplexer network 1320. In a similar manner, registers of the other MEs may also be examined. It will be appreciated that a specific register of any ME may be interrogated by use of decoder 1104 which maps a logical space into a physical space between the host processor and a respective ME, as previously described.

As previously described, the operation of an ME may be suspended by gating off its CPU clock. Upon gating off the clock, it is also possible to examine the current contents of the registers in that specific ME. In this manner, a static debug capability may be achieved. In another example, the present invention also contemplates implementing a single-step mode, in which the instructions stored in a specific ME may be executed sequentially one step at a time. By running the instructions in the single-step mode, the present invention allows observing the contents of the registers as they change, one step at a time. After an error has been located, the ME may be reprogrammed by the host processor via programming port 812 (FIG. 8).

Figure 14:
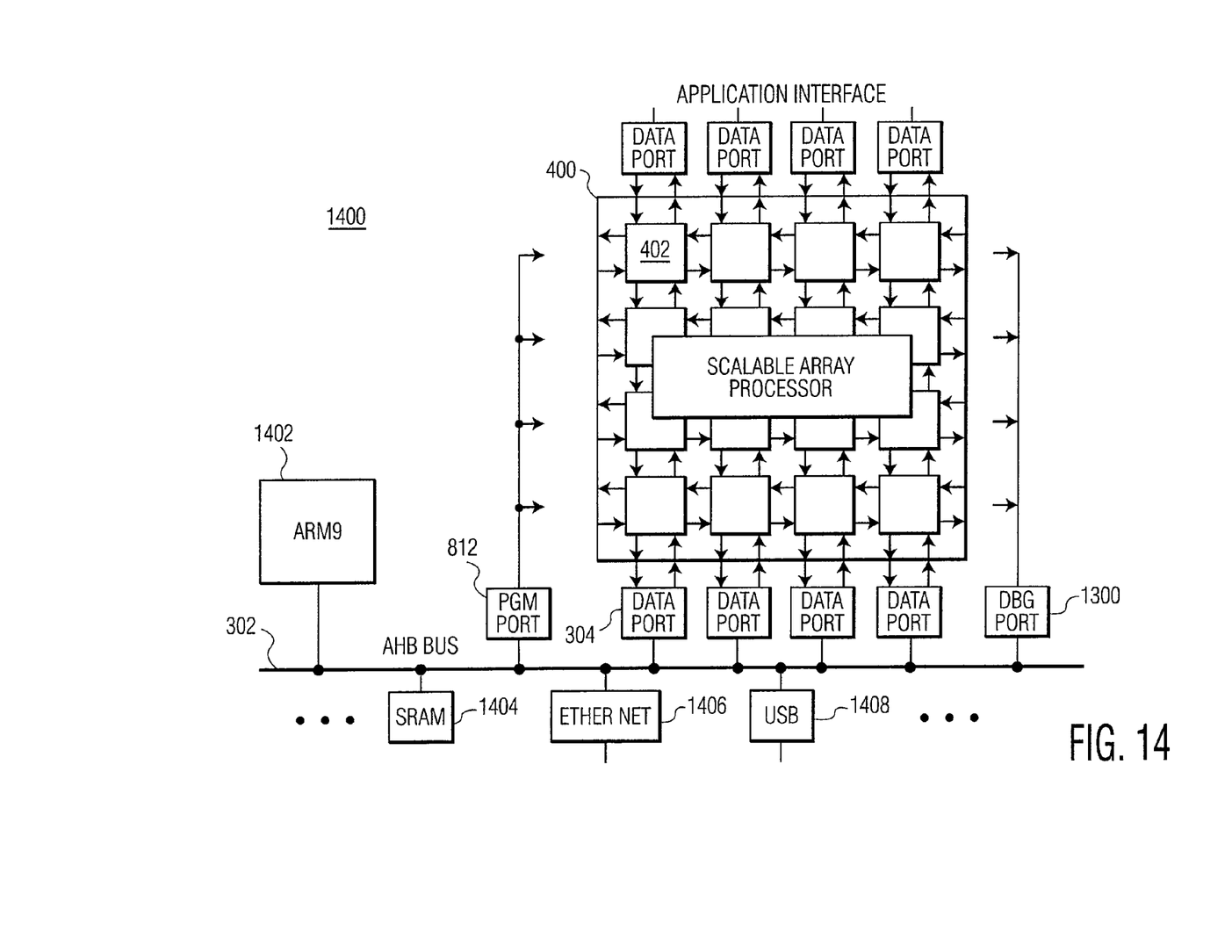
FIG. 14 is a block diagram showing a scaleable array processor communicating with peripheral devices connected on an on-chip bus, in accordance with an embodiment of the present invention.

A scaleable array processor system having some or all of the previously described features may be integrated into a single system on a chip (SOC), as illustrated in FIG. 14. As shown, SOC 1400 may include scaleable array processor 400, data ports 304, debug port 1300, programming port 812, host processor 1402, AHB 302, static random access memory (SRAM) 1404, Ethernet 1406 and universal serial bus (USB) 1408. Processor 1402 may be used for programming and debugging the scaleable array processor. On-chip bus 302 may be used for interconnecting host processor 1402, scaleable array processor 400, SRAM 1404, Ethernet 1406 and USB 1408. Other devices may also be coupled to on-chip bus 302.

Standard communication protocols may use Ethernet 1406 or USB 1408 to communicate with scaleable array processor 400. For example, an external device may pass data to the SOC via Ethernet 1406. The data may then be stored in SRAM 1404 for later processing or sent to array processor 400 for immediate processing. In another example, scaleable array processor 400 may be directly connected to an application interface such as an analog-to-digital converter (ADC) or a digital-to-analog converter (DAC) through its data ports.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed:

1. A system for implementing waveform processing in a software defined radio (SDR) comprising
a scaleable array processor including a plurality of microengines interconnected by a two dimensional topology,
each micro-engine including multiple FIFOs for interconnecting to each other in the two dimensional topology,
one micro-engine communicating with another adjacent micro-engine by way of the respective FIFOs, and
the micro-engines dedicated to predetermined algorithms;
wherein
each micro-engine includes an independent local memory and an independent instruction memory, both coupled to an independent microprocessor, and
the independent microprocessor is configured to execute an independent algorithm on data present in a dedicated FIFO of the respective micro-engine,
each micro-engine is event driven, wherein unless data is present in an input FIFO of the respective micro-engine, the respective micro-engine is in a sleep mode, and
the sleep mode disables a clock signal controlling the independent microprocessor and stops the execution of the independent algorithm, if all the multiple FIFOs of a respective micro-engine are empty, and the clock signal is generated by a phase locked loop; and wherein each processing engine includes a plurality of registers for executing multiple independent instructions, the plurality of registers from each processing engine are coupled to a multiplexer network, and a debug port is coupled between the multiplexer network and a host processor, and the host processor is configured to query each of the plurality of registers and receive data stored in the queried register by way of the multiplexer network for debug examination.

2. The system for implementing waveform processing of claim 1 wherein the two dimensional topology includes an array of N×M micro-engines interconnected by the multiple FIFOs, and N×M are integer numbers of rows and columns, respectively, in the array of micro-engines.

3. The system for implementing waveform processing of claim 1 wherein three micro-engines are dedicated, respectively, to the following predetermined algorithms: an input/output formatting algorithm, an encoder algorithm and a data interleaving algorithm.

4. The system for implementing waveform processing of claim 3 wherein the three micro-engines are serially threaded to provide data flow in the following sequence: first, the input/output formatting algorithm, second, the encoder algorithm, and third, the data interleaving algorithm.

5. The system for implementing waveform processing of claim 1 wherein each micro-engine includes an independent instruction memory coupled to an independent microprocessor and a respective FIFO for storing arriving data, a controller is configured to divide a stream of arriving data into at least two respective FIFOs of at least two respective micro-engines, and each of the two respective micro-engines is configured to execute an independent instruction on the divided stream of arriving data stored in the respective FIFOs.

6. The system for implementing waveform processing of claim 1 wherein the plurality of micro-engines are, respectively, dedicated to the following algorithms: finite input response (FIR), filter bank frequency excision, fast Fourier transform/inverse fast Fourier transform (FFT/IFFT), convolutional encoding/decoding, Walsh encoding/decoding, interleaving/de-interleaving, digital match filtering, digital quadrature mixing, automatic gain control, transmission security (TRANSEC) generation, and phase locked loop clock generation.

7. An array processing system comprising a plurality of processing engines interconnected as an array processor, each processing engine including multiple FIFOs, at least one FIFO of the multiple FIFOs of each processing engine providing an interconnection to at least another FIFO of the multiple FIFOs of another processing engine, each processing engine having an independent local memory, each processing engine having an independent instruction memory coupled to an independent microprocessor for executing multiple independent instructions, each processing engine including a plurality of registers for executing the multiple independent instructions, the plurality of registers from each processing engine coupled to a multiplexer network, a debug port coupled between the multiplexer network and a host processor, wherein the host processor is configured to query each of the plurality of registers and receive data stored in the queried register by way of the multiplexer network for debug examination, the processing engines, the multiplexer network, and the debug port of each processing engine are integrated on a single system on a chip (SOC), and a clock signal generated by a phase locked loop, wherein each of the processing engines is event driven, wherein unless data is present in an input FIFO of the respective processing engine, the respective processing engine is in a sleep mode, and the sleep mode disables the clock signal controlling a respective processing engine and stops the execution of the multiple independent instructions, if all the multiple FIFOs of the respective processing engine are empty.

8. The array processing system of claim 7 wherein the plurality of processing engines are interconnected in an array matrix of N×M rows and columns, where N and M are integer numbers.

9. The array processing system of claim 7 wherein each processing engine includes north, south, east and west FIFOs, for communicating, respectively, with adjacent south, north, west and east FIFOs of other processing engines.

10. The array processing system of claim 7, wherein the multiple FIFOs of each processing engine transmit parallel bits of data received from other processing engines to the respective independent microprocessor, the parallel bits of data are operated on by the respective independent microprocessor executing an independent instruction arriving from the respective independent instruction memory, each processing engine includes an active mode and an inactive mode, and the clock signal is configured to sequence each processing engine during execution of the multiple independent instructions, the active mode includes executing the multiple independent instructions and the inactive mode includes not executing the multiple independent instructions, each processing engine is configured to monitor the respective multiple FIFOs for presence of the parallel bits of data, and when the respective multiple FIFOs of a processing engine are empty, the clock signal is gated OFF to place the processing engine in the inactive mode, and when the respective multiple FIFOs of the processing engine include data, the clock signal is gated ON to place the processing engine in the active mode.

\* \* \* \* \*